US005725356A

United States Patent [19]

Carter

[11] Patent Number: 5,725,356
[45] Date of Patent: Mar. 10, 1998

[54] PORTABLE FAN DEVICE

[76] Inventor: C. Michael Carter, 10182 Natural Bridge Rd., St. Louis, Mo. 63134-3301

[21] Appl. No.: 779,975

[22] Filed: Dec. 23, 1996

Related U.S. Application Data

[63] Continuation of Ser. No. 430,440, Apr. 28, 1995, abandoned.
[51] Int. Cl.⁶ ..................................................... F04D 29/64
[52] U.S. Cl. ...................... 416/240; 416/244 R; 416/246; 416/247 R; 417/411; D23/382; D23/381
[58] Field of Search ...................... 416/63, 240, 244 R, 416/246, 247 R; 417/234, 411; D23/378, 381, 382, 412

[56] References Cited

U.S. PATENT DOCUMENTS

| D. 306,203 | 2/1990 | Wei . |
|---|---|---|
| D. 326,148 | 5/1992 | Lawlor . |
| D. 328,949 | 8/1992 | Rodrigue, Jr. . |
| 1,114,459 | 10/1914 | Fritts . |
| 1,504,003 | 8/1924 | Trumbull . |
| 1,751,793 | 3/1930 | Cook . |
| 1,971,332 | 8/1934 | Cook . |
| 2,036,478 | 4/1936 | Hoff et al. . |
| 2,144,860 | 1/1939 | Thorp . |
| 2,215,035 | 9/1940 | Gundelfinger . |
| 2,710,338 | 6/1955 | Svalgaard . |
| 2,763,428 | 9/1956 | Selah . |
| 2,812,900 | 11/1957 | Matthews . |
| 2,923,463 | 2/1960 | Shunkwiler . |
| 3,168,748 | 2/1965 | Limberg . |
| 3,225,982 | 12/1965 | Melton . |
| 3,262,638 | 7/1966 | Militello . |
| 3,491,374 | 1/1970 | Frangos . |
| 3,697,198 | 10/1972 | Holder, Jr. . |
| 4,044,750 | 8/1977 | Zeigler . |
| 4,687,414 | 8/1987 | Wardy . |
| 4,799,858 | 1/1989 | Shin-Chin . |
| 4,850,804 | 7/1989 | Huang . |
| 4,898,516 | 2/1990 | Hendricks . |
| 5,115,566 | 5/1992 | Zeitlin . |
| 5,304,035 | 4/1994 | Carter . |

OTHER PUBLICATIONS

Jecar Enterprise Co. Ltd., brochure for Fun Fans (date unknown).
Jecar Enterprise Co., Ltd. packaging insert (date unknown).
Winnower Fan Company, Inc. brochure, "Series 2120 L'tl Clippie", 1 page.

Primary Examiner—Christopher Verdier
Attorney, Agent, or Firm—Senniger, Powers, Leavitt & Roedel

[57] ABSTRACT

A portable fan for use on a child's stroller. The fan has a housing, an electric motor in the housing powered by a source such as a battery so that the motor does not require any physical connection to a fixed location, a mechanism for moving air including a shaft connected to the motor, a hub on the shaft and a plurality of blades, made of a resiliently flexible material, projecting radially outwardly from the hub, a shroud having an animal face depicted thereon connected to the housing and substantially enclosing said air moving mechanism, a clamp for releasably clamping the fan onto the stroller being shaped in the form of an animal foot and a bendable support interconnecting the housing and the fan.

23 Claims, 4 Drawing Sheets

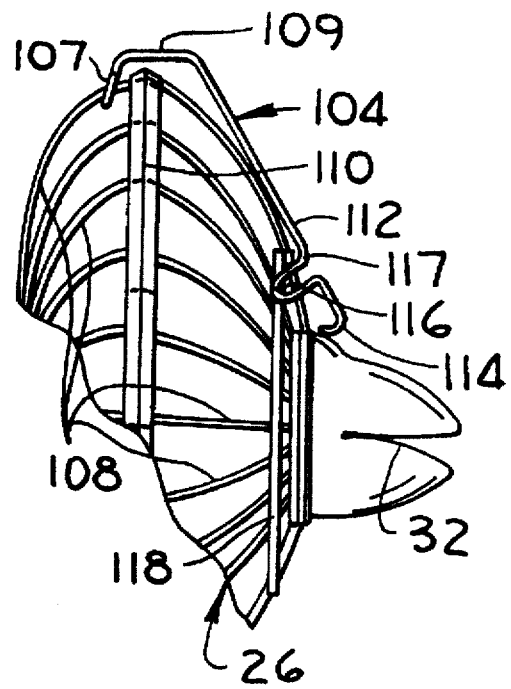
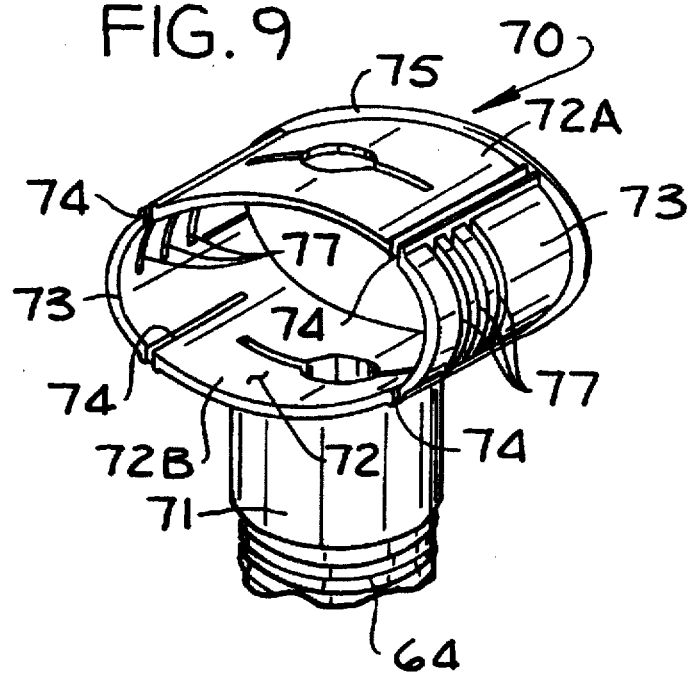

PORTABLE FAN DEVICE

This is a continuation of application Ser. No. 08/430,440, filed Apr. 28, 1995 now abandoned.

BACKGROUND OF THE INVENTION

This invention relates generally to fans, and more particularly, to a portable fan which is designed for mounting on various objects.

Generally, fans used for personal cooling are designed for static use, i.e., the fan is placed in a desired location and plugged in an electrical outlet. However, a stationary fan, which must be plugged into an electrical outlet, cannot be readily used when outside, or attached to a baby stroller that is being moved around. It would be desirable, such as when walking a baby in a stroller to have the benefit of a fan's cooling breeze on the baby. Moreover, there is greatly a need for a portable fan which can be mounted in different ways, or be held in the hand.

Many existing fans designed for safety have a protective cover to prevent a child or pet from injuring themselves on a rigid blade. However, a fan cover must necessarily have openings to permit the flow of air, and a persistent child may still be able to penetrate the cover through these openings. Fans having blades made of soft material without a protective cover are presently available. Yet even soft fan blades can cause eye injury to a child. A fan with soft blades, but without a cover, fails to reinforce with the child the fact that rapidly rotating objects are usually dangerous to touch.

Transportation of pets in cages can be uncomfortable and even dangerous to the pet in hot weather. Ventilation of the cage by a fan would be helpful, but it would not be easy to transport both the fan and the cage. A fan built into the cage would increase the cost of the cage and be dedicated exclusively to cooling the cage. Thus, there is presently a need for a fan which is inexpensive and readily mounted on the cage when needed.

SUMMARY OF THE INVENTION

Among the several objects and features of the present invention may be noted the provision of a fan device for mobile usage; the provision of such a fan device which is safe to use near a child or pet; the provision of such a fan device which is entertaining to children; the provision of such a fan device which can be mounted in several different ways or held in the hand; the provision of such a fan device which protects children from injury; the provision of such a fan device which teaches the child that rotating objects should not be touched; the provision of such a fan device which can be easily hung on a structure such as a pet's cage; and the provision of such a fan device which is of relatively simple and inexpensive construction.

Generally, a portable fan of the present invention is adapted for use on a child's stroller. The fan comprises a housing containing an electric motor. The electric motor is powered by a source, such as a battery, so that the motor does not require physical connection to a fixed location. The electric motor rotates air moving means which comprises a shaft, a hub and a plurality of blades made of a resiliently flexible material. A shroud is connected to the housing and substantially encloses the air moving means. An animal face is depicted on the shroud. The fan further comprises a clamp for releasably clamping onto a stroller. The clamp is shaped in the form of an animal foot which, along with the animal face form an animal character entertaining to children. A support extends between and interconnects the housing and the clamp.

In another aspect of the present invention, the fan is adapted for use on a pet cage. A hanger is pivotally connected to the fan for movement between a stowed position and a use position in which it may be hung on the cage.

In still another aspect of the present invention, a fan device having soft blades to protect a child from injury, and a shroud to protect against accidental contact with the eyes and to teach the child that rotating objects are not to be touched.

Other objects and features will be in part apparent and in part pointed out hereinafter.

BRIEF DESCRIPTION OF THE DRAWINGS

FIG. 8 is an enlarged fragmentary side elevation of the fan of FIG. 7 showing a hanger in a stowed position; and FIG. 9 is an enlarged perspective of a connector for attaching the fan to the clamp.

Corresponding reference characters indicate corresponding parts throughout the several views of the drawings.

DETAILED DESCRIPTION OF THE PREFFERED EMBODIMENTS

Figure 1:
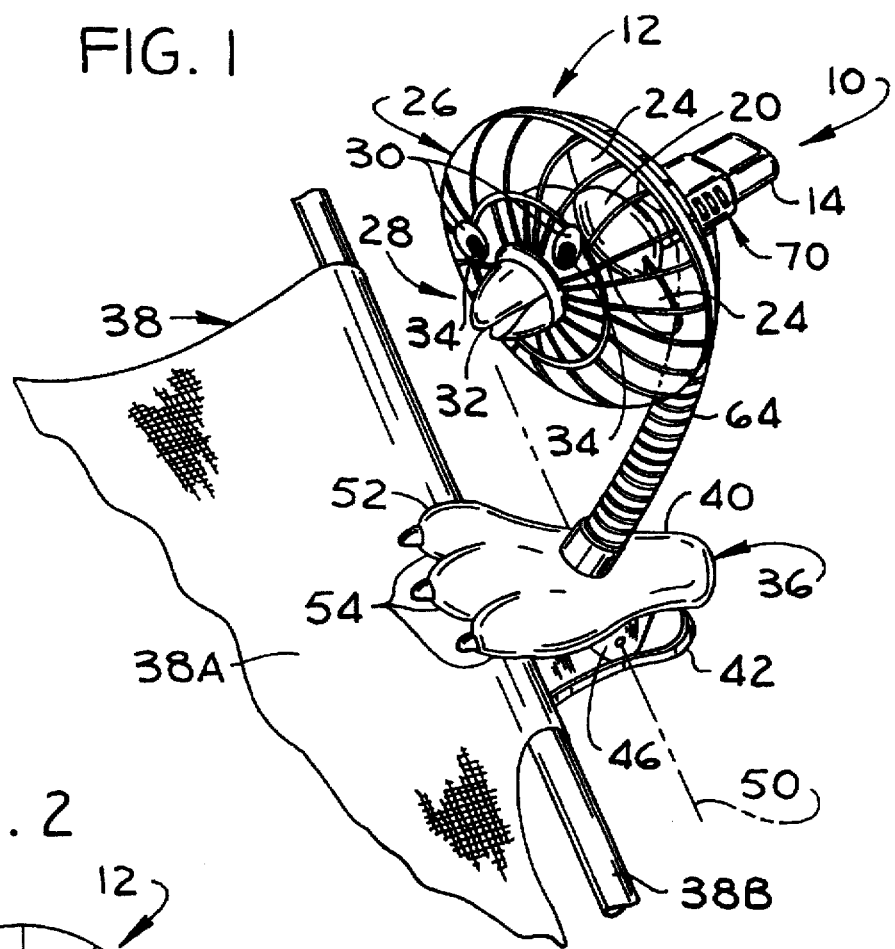
FIG. 1 is a perspective of the portable fan device mounted on a stroller.

Referring now to the drawings, a portable character fan device for use on a child's stroller is indicated generally at 10. A fan indicated generally at 12 comprises a housing 14 enclosing an electric motor. It will be understood that the electric motor may be powered by a battery or any other self contained source which does not require a physical connection to a fixed location. A solar powered cell is an example of another self contained power source. A shaft 18 connected to the motor mounts a hub 20 on its distal end from which a plurality of blades 24 project radially outward. The electric motor rotates the shaft 18 which turns the hub 20 and blades 24 creating a current of air. A shroud 26 connected to the housing 14 encloses the blades 24. The shroud 26 is formed in two halves which are joined together at locations around the circumference of the shroud 26. The housing 14, shaft 18, hub 20 and shroud 26 are all made of plastic. The blades 24 are made of a soft foam material to prevent injury to a child should the child penetrate the protective shroud 26. However, the shroud 26 is constructed to make it difficult for the child to touch the blades 24. It will be understood that other suitable materials could be used for the blades 24 without departing from the scope of the invention.

Figure 2:
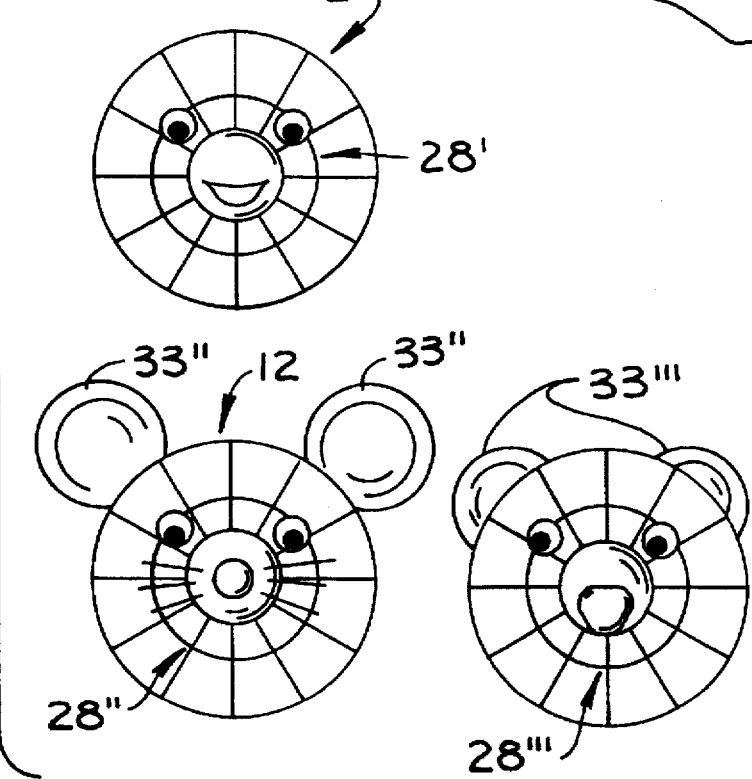
FIG. 2 is a front elevation of a shroud of the fan device of FIG. 1 illustrating various face designs.

An animal face, generally indicated at 28 is depicted on the shroud 26. In the preferred embodiment, the animal face 28 comprises a pair of eyes 30 and a nose 32 constructed for making a noise when squeezed. The eyes 30 are of the type in which the portion representing pupils 34 are free to move around in the eye when the fan 12 is moved. The nose 32 is of the type which squeaks when squeezed by forcing air out of the nose past surfaces (not shown), causing them to vibrate. However, it is envisioned that noise could be produced in other ways such as by activation of an electronic device (not shown) in the nose 32. As shown in FIG. 2, the animal face 28 may be a variety of different designs, (designated 28', 28" and 28'") all entertaining to young children. Some of the designs may include ears 33", 33'" or other features of the animal.

Figure 3:
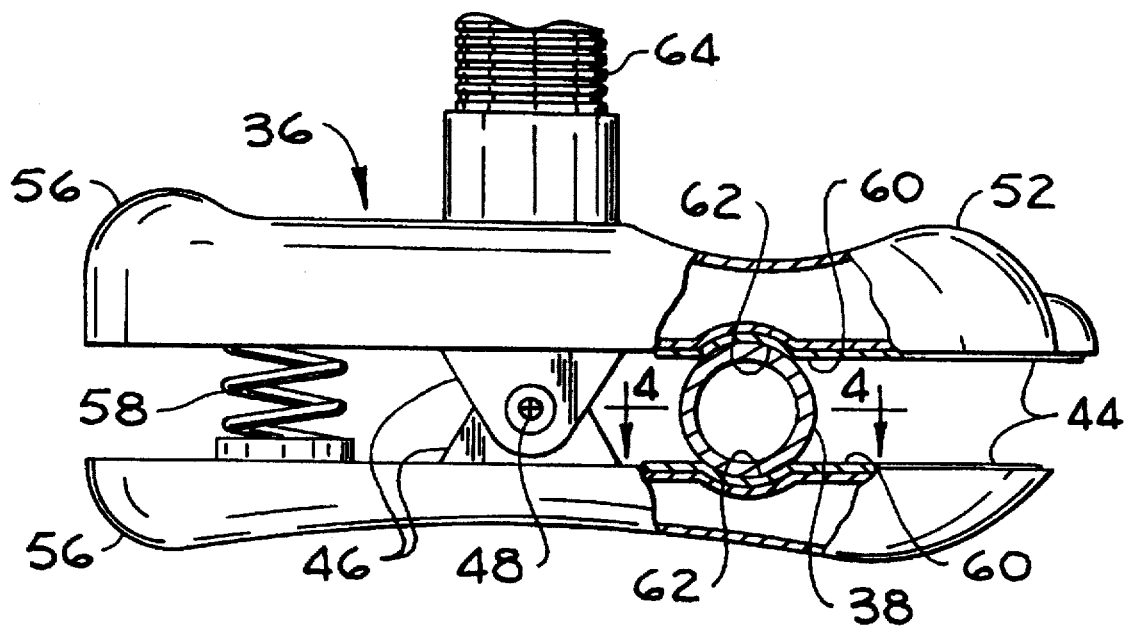
FIG. 3 is an enlarged fragmentary elevation of the fan device of FIG. 1 showing a clamp thereof with parts broken away to illustrate details.

As shown in FIG. 3, the fan 10 further comprises a clamp, generally indicated at 36 for releasably clamping the fan 10 onto a stroller, generally indicated at 38. The stroller shown in FIG. 1 is an umbrella stroller. Only a fragmentary portion of a back panel 38A and one tubular frame member 38B of the stroller 38 are shown in the drawings. The clamp 36 is shaped in the form of an animal foot so that the animal face 28 and foot cooperate to form an animal character entertaining to children. The clamp 36 comprises first and second clamping members 40, 42 having opposed clamping surfaces 44. The first and second clamping members 40, 42 are pivotally connected together for movement between an open position in which the clamping surfaces 44 are spaced apart and a closed position in which the clamping surfaces are closer together. The clamping members 40, 42 each include a pair of hinge elements 46 extending generally from the sides of one clamping member 40 toward the opposing clamping member 42. The hinge elements 46 are spaced such that the hinge elements of one clamping member 40 fit between the hinge elements of the other clamping member 42. One hinge element 46 of each clamping member 40, 42 is attached to a hinge element of the other clamping member by a pin 48 to form a hinge axis 50 about which the clamping members 40 can pivot. Each clamping member 40, 42 further includes a toe portion 52 formed with one or more toes and a heel portion 56. The toe portion 52 is generally wider than the heel portion 56 and includes the clamping surfaces 44. A compression spring 58 mounted between the heel portions 56 of the clamping members biases them toward the closed position.

Figure 4:
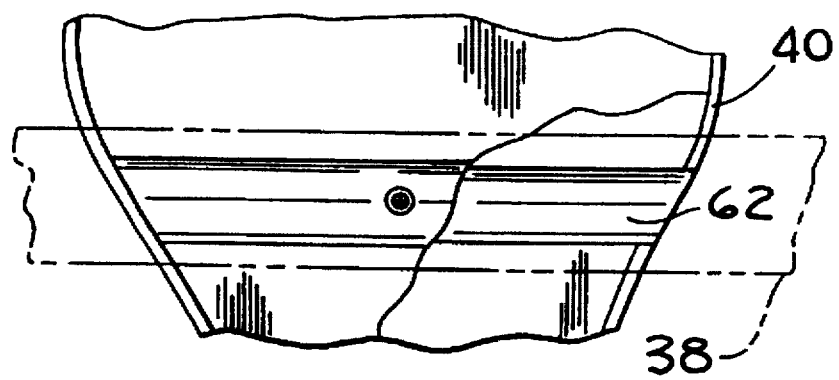
FIG. 4 is a fragmentary section of the clamp indicated by line 4—4 of FIG. 3 with parts being broken away to illustrate details.

Clamping surfaces 44 each include a sheet of frictionalizing material 60 and an elongated recess 62 shaped to conform with a portion of the stroller 38. The recesses 62 of the clamping surfaces 44 cooperate in the closed position of the clamp 36 to receive the portion of the stroller 38 to which they conform (e.g., a portion of the tubular frame member 38B) for firmly securing the fan device 10 on the stroller. As shown in FIG. 4, the recesses 62 extend transversely of the clamping members 40, 42 and are generally arcuate in cross section.

Figure 5:
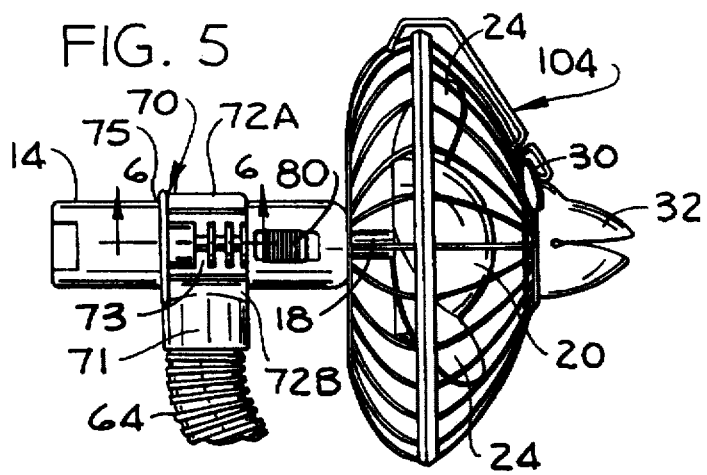
FIG. 5 is an enlarged side elevation of the fan of FIG. 1.

As shown in FIG. 5, a bendable support 64 extends between and interconnects the housing 14 and clamp 36. The support 64 is constructed for manually bending to numerous positions relative to the clamp 36 in which the bendable support is capable of retaining itself and the fan 12. The bendable 64 support includes a connector 70 for releasably connecting the fan 12 to the bendable support. The connector 70 is constructed for receiving a portion of the housing 14 therein.

As shown in FIG. 9, the connector 70 has a base 71 connected to the bendable support 64 and a generally oval opening 72, corresponding to the cross sectional shape of the outer surface of the housing 14. The opening 72 is defined by upper and lower members (designated 72A and 72B, respectively) and leaf spring members 73 separated from the upper and lower members by slots 74. The upper and lower members 72A, 72B and leaf spring members 73 are all joined at their reward edges to an oval rim 75 at the rear of the connector 70. The lower member 72B is joined to the base 71, but the upper member 72A and leaf spring members 73 are free of connection to the connector 70 except at the rim 75.

To connect the fan 12 to the bendable support 64 and clamp 36 using the connector 70 the rear of the housing 14 is inserted rearwardly into the oval opening 71 of the connector. The external cross sectional dimensions of the housing 14 are approximately the same as the internal dimensions of the opening 72. The leaf spring members 73 (and upper member 72A) flex resiliently outwardly as the housing 14 is inserted. The resiliency of the leaf spring members 73 and upper member 72A causes them to bear against the housing 14 for use in holding the fan.

Figure 6:
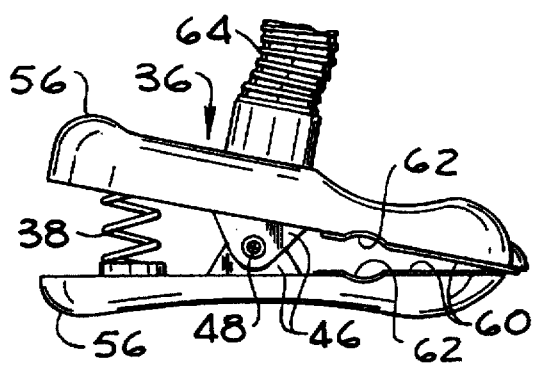
FIG. 6 is a greatly enlarged fragmentary section taken in the plane including line 6—6 of FIG. 5.
Figure 6:
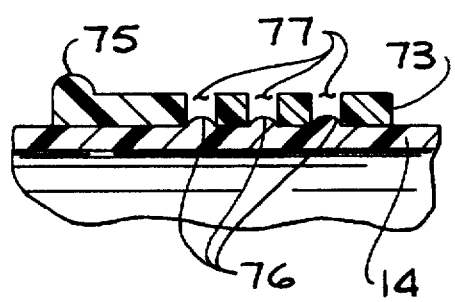

Nubs 76 formed integrally with the housing 14 project laterally outwardly from both sides of the housing, and are positioned to engage the spring leaf members 73 upon insertion of the housing into the connector 70. The leaf spring members 73 are formed with slots 77 extending transversely of the leaf spring members and sized for receiving the nubs, as shown in FIG. 6. In the illustrated embodiment, there are three nubs 76 on each side of the housing and three slots in each leaf spring member 73. However, there may be a greater or lesser number of nubs 76 and slots 77 without departing from the scope of the present invention.

The nubs 76 are automatically engaged in the slots upon insertion of the fan 12 into the connector 70. More specifically, as the housing 14 moves rearwardly into the connector 70, the rearwardmost nub 76 on each side of the housing 14 engages the forward edge of a respective leaf spring member 73. The engagement of each rearwardmost nub 76 with its corresponding leaf spring member 73 wedges the leaf spring member laterally outwardly to permit the nub to pass under the leaf spring member. The other two nubs 76 on that side of the housing also pass under the leaf spring member 73 and the nubs eventually move into registration with the slots 77. The leaf spring member 73 then moves back toward the housing 14 so that the nubs are received in the slots 77 and are engageable with the leaf spring member on the edges of the slots to resist further relative sliding motion between the connector 70 and the housing. The leaf spring member 73 and nubs 76 on the other side of the housing 14 interact in the same way at substantially the same time.

The leaf spring members 73 and nubs 76 apply a holding force which is sufficient to hold the fan 12 in the connector 70 without regard to the angle the connector and fan are positioned at with respect to the horizontal. Although the weight of the fan 12 is not sufficient to overcome the holding force of the leaf spring members 73 and nubs 76, it is possible to remove the fan from the connector by applying a manual force to the fan in a direction axially forward from the connector 70. In that event, the nubs 76 are forced back under the leaf spring members 73 which are wedged laterally outwardly to permit the nubs to pass out from under them to release the fan 12 from the connector 70.

Figure 7:
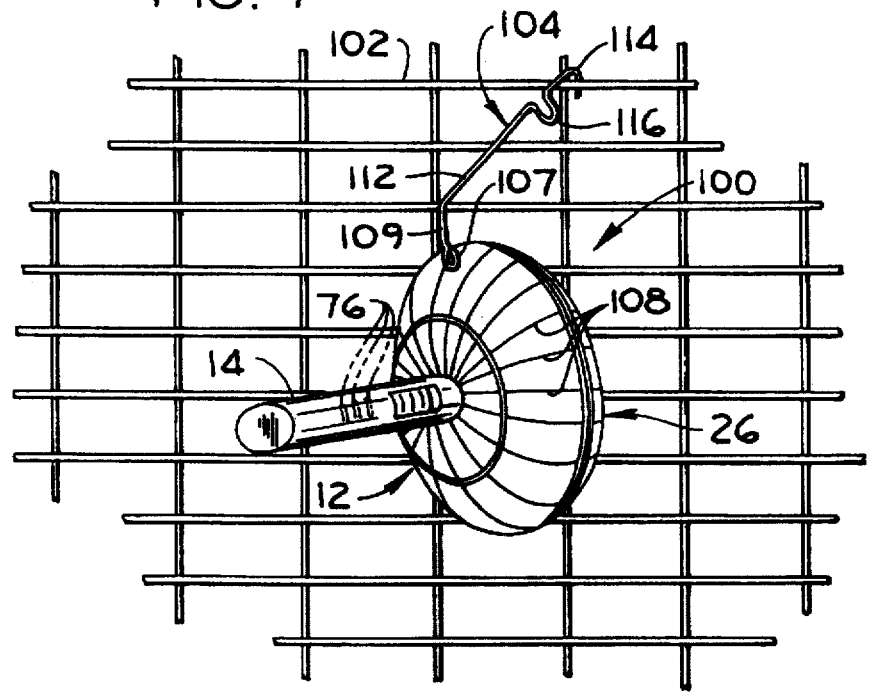
FIG. 7 is a perspective of a portable fan of a second embodiment attached to a pet cage.

In another embodiment generally indicated at 100, the fan 12 is provided with a hanger 104 for selectively connecting the fan to a pet cage 102 for keeping a pet cool (FIG. 7). The hanger 104 is connected to the shroud 26 at one end and is pivotable on the shroud between a use position (FIG. 7) and a stowed position (FIG. 8) The hanger 104 is formed from a metal wire bent to have an eyelet 107 encircling one of the radial ribs 108 on the back side of the shroud 26. It is to be understood that the hanger 104 could be made of other suitable material. A first shank segment 109 extends from the eyelet a distance somewhat greater than the width of a rim 110 of the shroud along which the two halves of the shroud are connected. A second shank segment 112 extends at an angle from the first shank segment 109 so that hanger 104 generally conforms to the shroud 26 in the stowed position. The hanger 104 is shown in phantom in FIG. 5 to illustrate the fan 12 of embodiment 100 attached to the bendable support 64 and clamp 36.

The free end of the hanger 104 is formed as a hook 114 which is capable of hooking onto the wire screen of the pet cage 102. Adjacent to the hook 114 is a loop 116 (broadly, "protruding formation") having a return portion which extends back upon the second shank segment 112, forming an elbow 117. The length of the second shank segment 112 is approximately equal to the distance between the rim 110 and a circular rib 118 on the front of the shroud 26. As the hanger 104 is pivoted down from its use position toward its stowed position the return portion of the loop 116 engages the circular rib 118 and deflects it from its relaxed position until the circular rib snaps into the elbow 117. The hanger 104 is thereafter held in the stowed position by engagement of the second shank segment 112 and return portion of the loop 116 with opposite sides of the circular rim 118. The hanger 104 may be released from the shroud 26 by pulling the hanger in a direction away from the shroud with sufficient force to cause the circular rib 118 to flex enough to clear the loop 116.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A fan device for use in proximity to children and pets, the fan device comprising:

a housing;

an electric motor in the housing;

a self-contained power source associated with the housing for selectively powering the motor;

means for moving air comprising a shaft connected to the motor for rotation by the motor, a hub on the shaft and a plurality of blades projecting radially outwardly from the hub, said blades being made of a resiliently flexible material which will not cut human skin when brought into contact with the blades when rotating; and a shroud connected to the housing and substantially enclosing said air moving means while permitting air movement through the shroud, the shroud having openings sized to prevent children from inserting their fingers through the openings.

2. A fan device as set forth in claim 1 further comprising:

a face depicted on the shroud;

a clamp for releasably clamping onto a stroller, the clamp having the shape of a foot whereby the face and foot cooperate to form a character;

a support extending between and interconnecting the housing and the clamp.

3. A fan device as set forth in claim 2 wherein the clamp comprises first and second clamping members having opposed clamping surfaces, the first and second clamping members being pivotally connected together for movement between an open position in which the clamping surfaces are spaced apart and a closed position in which the clamping surfaces are closer together, means for biasing the clamping members toward the closed position, a sheet of frictionalizing material on each clamping surface, and an elongated recess in each clamping surface in which a portion of the frictionalizing material is received, the elongated recesses being shaped to conform with portions of the stroller and cooperating in the closed position of the clamp to receive the portions of the stroller to which they conform for firmly securing the fan device on the stroller.

4. A fan device as set forth in claim 2 wherein the support comprises a connector for releasably connecting the fan to the support, the connector being constructed for receiving a portion of the housing therein, the connector comprising elastic means for bearing against the housing to hold the fan in the connector, said elastic means bearing against the housing with a force selected to hold the fan from sliding out of the connector because of its own weight, but which may be overcome by application of a manual force to remove the fan from the connector.

5. A fan device as set forth in claim 1 further comprising a hanger pivotally connected to the fan for movement between a stowed position and a use position.

6. A portable character fan device for use on a child's stroller, the fan device comprising:

a fan including:
   (a) a housing;
   (b) an electric motor in the housing;
   (c) a self-contained power source associated with the housing for selectively powering the motor;
   (d) means for moving air comprising a shaft connected to the motor for rotation by the motor, a hub on the shaft and a plurality of blades projecting radially outwardly from the hub;
   (e) a shroud connected to the housing and substantially enclosing said air moving means while permitting air movement through the shroud; and a face depicted on the shroud;

a clamp for releasably clamping onto the stroller, the clamp having the shape of a foot whereby the face and foot cooperate to form a character; and a support extending between and interconnecting the housing and the clamp.

7. A portable character fan device as set forth in claim 6 wherein the clamp comprises a pair of clamping members, each member having a clamping surface, the clamping members being pivotally connected to each other for movement between an open position in which the clamping surfaces are spaced apart and a closed position in which the clamping surfaces are closer together, and means for biasing the clamping members toward the closed position, each clamping member including a toe portion formed with one or more toes and a heel portion, the toe portion generally being wider than the heel portion and including the clamping surfaces, and wherein the face comprises a pair of eyes and a nose constructed for making a noise when squeezed.

8. A portable character fan device as set forth in claim 6 wherein the clamp comprises first and second clamping members having opposed clamping surfaces, the first and second clamping members being pivotally connected together for movement between an open position in which the clamping surfaces are spaced apart and a closed position in which the clamping surfaces are closer together, means for biasing the clamping members toward the closed position, a sheet of frictionalizing material on each clamping surface, and an elongated recess in each clamping surface in which a portion of the frictionalizing material is received, the elongated recesses being shaped to conform with portions of the stroller and cooperating in the closed position of the clamp to receive the portions of the stroller to which they conform for firmly securing the fan device on the stroller.

9. A portable character fan device as set forth in claim 8 wherein the recesses on the opposing clamping surfaces of the first and second clamping members extend transversely of the clamping members and are generally arcuate in cross section.

10. A portable character fan device as set forth in claim 6 wherein the support comprises a connector for releasably connecting the fan to the support.

11. A portable character fan as set forth in claim 10 wherein the connector is constructed for receiving a portion of the housing therein, the connector comprising elastic means for bearing against the housing to hold the fan in the connector, said elastic means bearing against the housing with a force selected to hold the fan from sliding out of the connector because of its own weight, but which may be overcome by application of a manual force to remove the fan from the connector.

12. A portable character fan device as set forth in claim 11 wherein said elastic means has at least one opening therein, and wherein the housing has at least one nub receivable in the opening.

13. A portable character fan device as set forth in claim 12 wherein said elastic means comprises a pair of spaced apart spring leaf members capable of receiving a portion of the housing therebetween, each spring leaf member having a plurality of openings therein, and wherein the housing has a plurality of hubs thereon receivable in corresponding openings in the spring leaf members.

14. A portable character fan device as set forth in claim 10 further comprising a hanger pivotally connected to the fan for movement between a stowed position and a use position.

15. A portable character fan device as set forth in claim 14 wherein the hanger is constructed for releasably locking engagement with the shroud.

16. A portable character fan device as set forth in claim 15 wherein the hanger is connected to the shroud at one end and is formed in a hook shape generally at the opposite end for hooking onto a structure from which the fan is to be hung, the hanger having a protruding formation positioned along the length of the hanger and shaped for engagement with the shroud in the stowed position to releasably lock the hanger on the shroud in the stowed position.

17. A portable character fan device as set forth in claim 6 wherein said blades are made of a resiliently flexible material which will not cut human skin when brought into contact with the blades when rotating.

18. A portable fan device mountable on a structure, the fan device comprising:
 a fan including:
  (a) a housing;
  (b) an electric motor in the housing;
  (c) a self-contained power source associated with the housing for selectively powering the motor;
  (d) means for moving air comprising a shaft connected to the motor for rotation by the motor, a hub on the shaft and a plurality of blades projecting radially outwardly from the hub; and
  (e) a shroud connected to the housing and substantially enclosing said air moving means while permitting air movement through the shroud;
 a clamp for releasably clamping onto a structure; and
 a support extending between and interconnecting the fan and the clamp, the support including a connector for releasably connecting the fan to the support, wherein the connector is constructed for receiving a portion of the housing, the connector comprising elastic means for bearing against the housing to hold the fan in engagement with the connector, said elastic means bearing against the housing with a force selected to hold the fan from moving out of engagement with the connector because of its own weight, but which may be overcome by application of a manual force to remove the fan from the connector.

19. A portable fan device as set forth in claim 18 wherein said elastic means has at least one opening therein, and wherein the housing has at least one hub receivable in the opening.

20. A portable fan device as set forth in claim 19 wherein said elastic means comprises a pair of spaced apart spring leaf members capable of receiving a portion of the housing therebetween, each spring leaf member having a plurality of openings therein, and wherein the housing has a plurality of nubs thereon receivable in corresponding openings in the spring leaf members.

21. A portable fan device mountable on a structure, the fan device comprising:
 fan including,
  a housing;
  an electric motor in the housing;
  a self-contained power source associated with the housing for selectively powering the motor;
  means for moving air comprising a shaft connected to the motor for rotation by the motor, a hub on the shaft and a plurality of blades projecting radially outwardly from the hub;
  a shroud connected to the housing and substantially enclosing said air moving means while permitting air movement through the shroud, the shroud having a back side through which air is drawn by said air moving means into the shroud, and a front side through which said air moving means pushes air out of the shroud; and
 a hanger pivotally connected to the fan for movement between a stowed position and a use position, the hanger having a hook-shaped free end and being disposed for projecting forwardly of the front side of the shroud in the use position for hooking onto the structure forward of the front side of the shroud with the hook-shaped free end.

22. A portable fan device mountable on a structure, the fan device comprising:
 a fan including:
  (a) a housing;
  (b) an electric motor in the housing;
  (c) a self-contained power source associated with the housing for selectively powering the motor;
  (d) means for moving air comprising a shaft connected to the motor for rotation by the motor, a hub on the shaft and a plurality of blades projecting radially outwardly from the hub; and
  (e) a shroud connected to the housing and substantially enclosing said air moving means while permitting air movement through the shroud; and
 a hanger pivotally connected to the fan for movement between a stowed position and a use position, wherein the hanger is constructed for releasably locking engagement with the shroud in the stowed position.

23. A portable fan device as set forth in claim 22 wherein the hanger is connected to the shroud at one end and is formed in a hook shape generally at the opposite end for hooking onto a structure from which the fan is to be hung, the hanger having a protruding formation positioned along the length of the hanger and shaped for engagement with the shroud in the stowed position to releasably lock the hanger in the stowed position.

* * * * *